(12) United States Patent
Mathis, II

(10) Patent No.: US 10,775,600 B2
(45) Date of Patent: Sep. 15, 2020

(54) SMART MEDIA DEVICE PLATFORM AS AN INVERSE MICROSCOPIC IMAGING APPARATUS

(71) Applicant: Stephan Roy Mathis, II, Temple Hills, MD (US)

(72) Inventor: Stephan Roy Mathis, II, Temple Hills, MD (US)

(73) Assignee: Stephan R. Mathis, II, Temple Hills, MD (US)

( * ) Notice: Subject to any disclaimer, the term of this patent is extended or adjusted under 35 U.S.C. 154(b) by 130 days.

(21) Appl. No.: 16/236,627

(22) Filed: Dec. 30, 2018

(65) Prior Publication Data
US 2019/0204576 A1 Jul. 4, 2019

Related U.S. Application Data

(60) Provisional application No. 62/613,476, filed on Jan. 4, 2018.

(51) Int. Cl.
*G02B 21/00* (2006.01)
*G02B 21/26* (2006.01)
*G02B 21/36* (2006.01)

(52) U.S. Cl.
CPC ......... *G02B 21/0088* (2013.01); *G02B 21/26* (2013.01); *G02B 21/362* (2013.01)

(58) Field of Classification Search
CPC .... G02B 21/362; G02B 21/26; G02B 21/368; G02B 21/0008; G03B 17/561; G03B 17/17565
See application file for complete search history.

(56) References Cited

U.S. PATENT DOCUMENTS

| 8,253,787 B2 * | 8/2012 | Yamamoto | G03B 17/565 348/79 |
| 9,057,702 B2 * | 6/2015 | Ozcan | G02B 7/006 |
| 9,835,842 B2 * | 12/2017 | Fan | G02B 21/06 |
| 9,958,658 B2 * | 5/2018 | Hsu | G02B 21/34 |

(Continued)

FOREIGN PATENT DOCUMENTS

CN 205246967 U * 5/2016
TW M491168 U * 12/2014

OTHER PUBLICATIONS

Hollis; "Five Reasons to Use Inverted Microscopes over Regular Microscopes"; Jan. 28, 2016; Scribble Print; <http://scribbleprint.com/five-reasons-to-use-inverted-microscopes-over-regular-microscopes/> (Year: 2016).*

*Primary Examiner* — John Villecco

(57) ABSTRACT

An inverse microscope as a smart media device platform is provided. The smart media device platform includes a lower surface, sample stage, and a light source mount. The apparatus includes a lower, middle, and upper portion. The lower portion is a base that supports the smart media device, the middle portion is for the sample stage and the upper portion is the light source mount. The lower base is coupled to the middle sample stage by multiple support pillars. The inverse microscope further includes the magnifying loop as the objective, disposed proximal to the middle portion. And a light source disposed proximal to middle portion. The magnifying loop arm may be removed and replaced with a magnifying loop arm to achieve varied loop magnification power.

10 Claims, 6 Drawing Sheets

(56) References Cited

U.S. PATENT DOCUMENTS

| | | | |
|---|---|---|---|
| 9,958,665 B2* | 5/2018 | Hsu | G01N 15/06 |
| 10,288,869 B2* | 5/2019 | Lin | G02B 21/0008 |
| 10,416,432 B2* | 9/2019 | Balagurusamy | G02B 21/361 |
| 10,495,863 B2* | 12/2019 | Lin | G02B 21/0008 |
| 10,495,868 B2* | 12/2019 | Lin | G02B 21/26 |
| 10,578,851 B2* | 3/2020 | Fletcher | G02B 21/0008 |
| 2014/0267670 A1* | 9/2014 | Tipgunlakant | G02B 21/16 |
| | | | 348/79 |
| 2015/0184791 A1* | 7/2015 | Chow | F16M 11/2021 |
| | | | 248/124.2 |
| 2016/0004057 A1* | 1/2016 | Lin | G02B 21/0008 |
| | | | 359/363 |
| 2016/0062099 A1* | 3/2016 | Shankar | G02B 21/24 |
| | | | 359/384 |
| 2017/0146784 A1* | 5/2017 | Schmidt | G02B 21/368 |
| 2018/0252907 A1* | 9/2018 | Cho | G02B 21/086 |
| 2019/0302093 A1* | 10/2019 | Hsu | G01N 15/1463 |
| 2020/0057288 A1* | 2/2020 | Schulze | G02B 21/0008 |

* cited by examiner

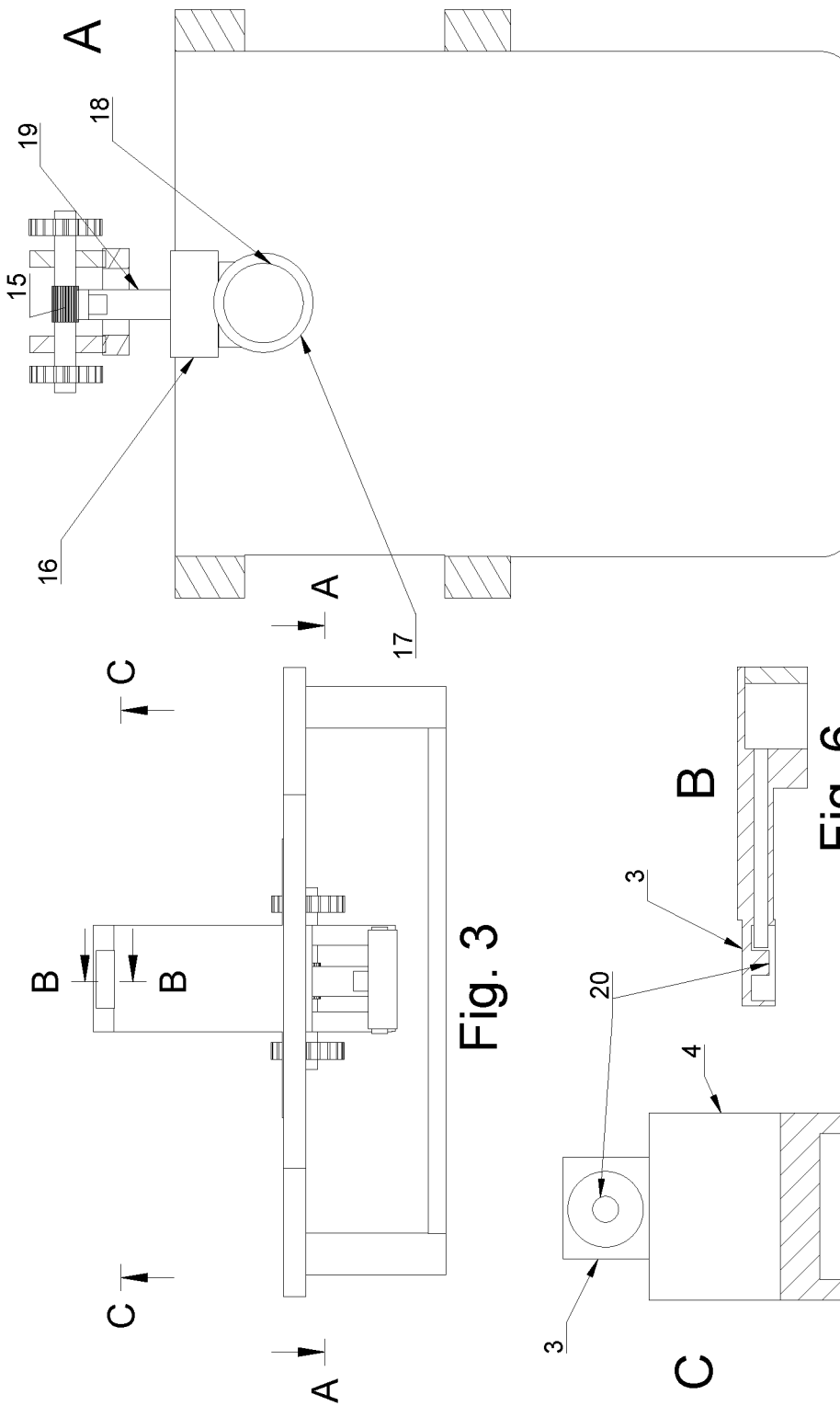

SMART MEDIA DEVICE PLATFORM AS AN INVERSE MICROSCOPIC IMAGING APPARATUS

TECHNICAL FIELD

The technical field of this apparatus would be in the field of microscopy, smart media device accessories, camera accessories, and smart media device platforms.

SUMMARY OF APPARATUS

This embodiment is a platform that supports a smart media device to be situated under a deck. Said deck provides a surface to mount a sample of interest. The sample of interest resides on a sample stage as on an inverted microscope. A hole in said deck is used to align a smart media device camera and magnifying loop beneath said sample, with purpose to use the smart media device to microscopically image the underside of said sample. The sample stage is mesial to the mounted light source and the smart media device platform. A pinion engages with a rack at the breech of the apparatus and can be vertically adjusted over the camera lens of the smart media device. A light source is projected above the sample stage and aligned with the foramen to provide adequate lighting for transparency through the sample for imaging.

Technical Problem

Materials are difficult to image with a smart media device because of the limitations of magnifying power on said device and the ability to keep said device steady during image acquisition. When attaching a smart media device to a compound microscope, the usual route is to attach it to an eyepiece, which has proven difficult. The difficulty arises when aligning the optics of the smart media device with the optics on the compound microscope. Others have worked to solve this issue, but most of them involve a compound microscope that may be expensive, difficult to transport, and fragile. Also, upright compound light microscopes make imaging the bottom of petri dishes and clear vials nearly impossible due to a limited working distance and distortion due to glass effects. Inverted compound light microscopes can alleviate this issue, however are less common and can be expensive, difficult to transport, and fragile. I offer an inexpensive, portable, adaptable solution for an inverted microscope involving a smart media device platform as an inverse microscopic imaging apparatus.

Solution to Problem

The solution is a smart media device platform whereby said device can be rested on a surface that is aligned with a magnifying lens acting as an objective. The magnifying lens can be adjusted by a scroll wheel, held together with a mandrel, and the adjustment will allow the camera on the smart media device to focus on the underside of the sample that rests on the sample stage above it. The portion of the sample being analyzed is to align with the hole on the sample stage. A light source affixed above the sample gives light for transparent sample applications. The image displayed on the smart media device can then be captured. This apparatus does not involve a compound light microscope, an inverted compound light microscope, or a smart media device attachment accessory to an eyepiece of a compound light microscope.

Advantageous Effects of Apparatus

This apparatus allows for fast, convenient and inexpensive microscopic imaging of samples using a smart media device.

BRIEF DESCRIPTION OF DRAWINGS

Some specific example embodiments of the disclosure may be understood by referring, in part, to the following description and the accompanying drawings.

FIG. 3: Illustrates a front view of an embodiment of a smart media device platform to depict multiple labelled sections.

FIG. 4: Illustrates a cross section view of an embodiment of a light source, parallel to the sample stage and from beneath the light source arm.

FIG. 5: Illustrates a cross section view of an embodiment of a light source arm and the tower to which the battery pack resides to power a light source.

FIG. 6: Illustrates a cross section view of an embodiment of an interchangeable magnifying loop with the adjustable rack and pinion that resides under the sample stage and above the smart media device resting surface.

DESCRIPTION OF EMBODIMENTS

The smart media device microscope platform in its current embodiment, is positioned to have a smart media device rest on the lower platform, with its camera aligned with the magnifying loop. The magnifying loop is to remain aligned with the hole inside the sample stage that allows for an inverse view of the sample. A light source is to be used to illuminate the field and create a transparent sample suitable for microscopic imaging.

In certain embodiments, a light source is an assortment of light wavelengths.

In certain embodiments, the sample stage is made of an opaque, sturdy, lightweight plastic of any color.

In certain embodiments, the sample stage is of a different dimension and shape, possibly a square, hexagon, or any practical shape.

In certain embodiments, a light source mount can be removed to accommodate taller samples and use environmental lighting.

In certain embodiments, a light source mount is a joint that can move upward and to the side, or away from the hole in the sample stage.

In certain embodiments, the smart media device platform base can be comprised of a different material, such as a lightweight, sturdy polymer of various colors.

In certain embodiments, the dimensions of the smart media device platform is of smaller or larger dimensions.

In certain embodiments, the rack and pinion is comprised of another material, such as a lightweight, sturdy, polymer.

In certain embodiments, the groove dimensions and size on the rack and pinion are varied for variable refined scrolling.

In certain embodiments, the hole on the sample stage is of a varied size and shape, conducive to imaging under the sample.

In certain embodiments, the position of the hole on the sample stage is varied.

In certain embodiments, the extension and position of the light source mount is varied to match the position of the hole.

In certain embodiments, the magnifying loop is of various shapes and dimensions.

In certain embodiments, the magnifying loop is of another magnifying material, such as a clear plastic.

In certain embodiments, the magnifying loop is not concentric with a polymer case.

In certain embodiments, the sample stage is supported by various number of beams, other than four.

In certain embodiments, the marge of the sample stage, smart media device platform is of various angles.

DESCRIPTION OF DRAWINGS

Figure 1:
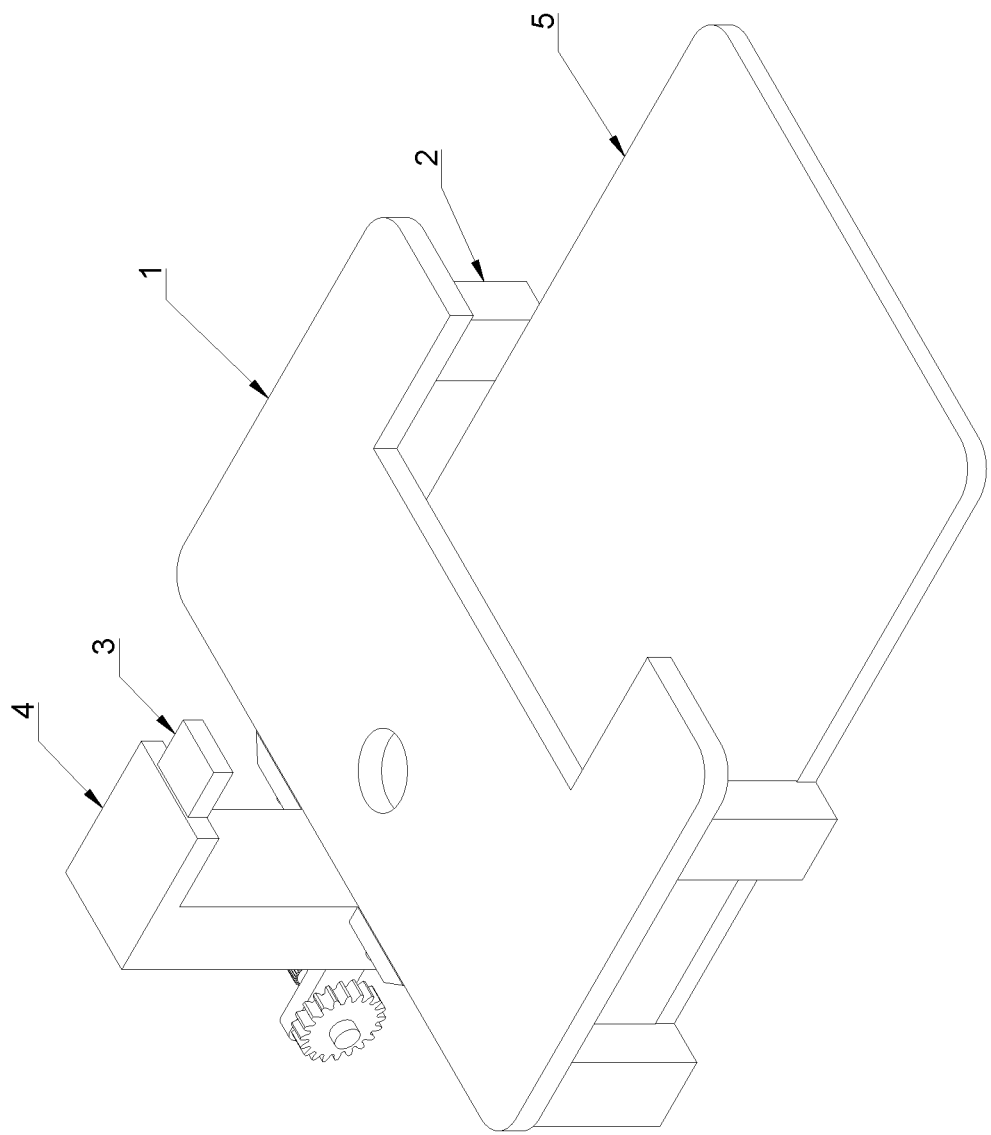
FIG. 1: Illustrates the top left front view of an embodiment of a smart media device platform.

FIG. 1: The sample is to rest on the sample stage 1 for microscopic imaging. The area of interest is to be aligned over the hole to expose the underneath of the sample to the magnifying loop 18. The stage 1 is a rectangular shape in this embodiment. The stage 1 is supported by pillars 2 that are stabilized and connected to the smart media device platform 5 that resides beneath the sample stage 1. In this embodiment, the pillars 2 are not adjustable. A light source 20 light housing 3 is aligned with the hole in the stage 1 to illuminate the sample to make it transparent for image capture. A light source 20 within a tower 4 for internal wiring and battery pack to supply a light source 20 with power. The platform 5 is for the placement of the smart media device that is equipped with a camera. Said platform 5 in this embodiment is large enough to accommodate smart media devices of a large scale. The material for 3, 4, and 5 is to be made of a sturdy, lightweight polymer such as an opaque high density polyethylene. The sample stage 1 in this embodiment is of a material such as a transparent or translucent polyvinyl.

Figure 2:
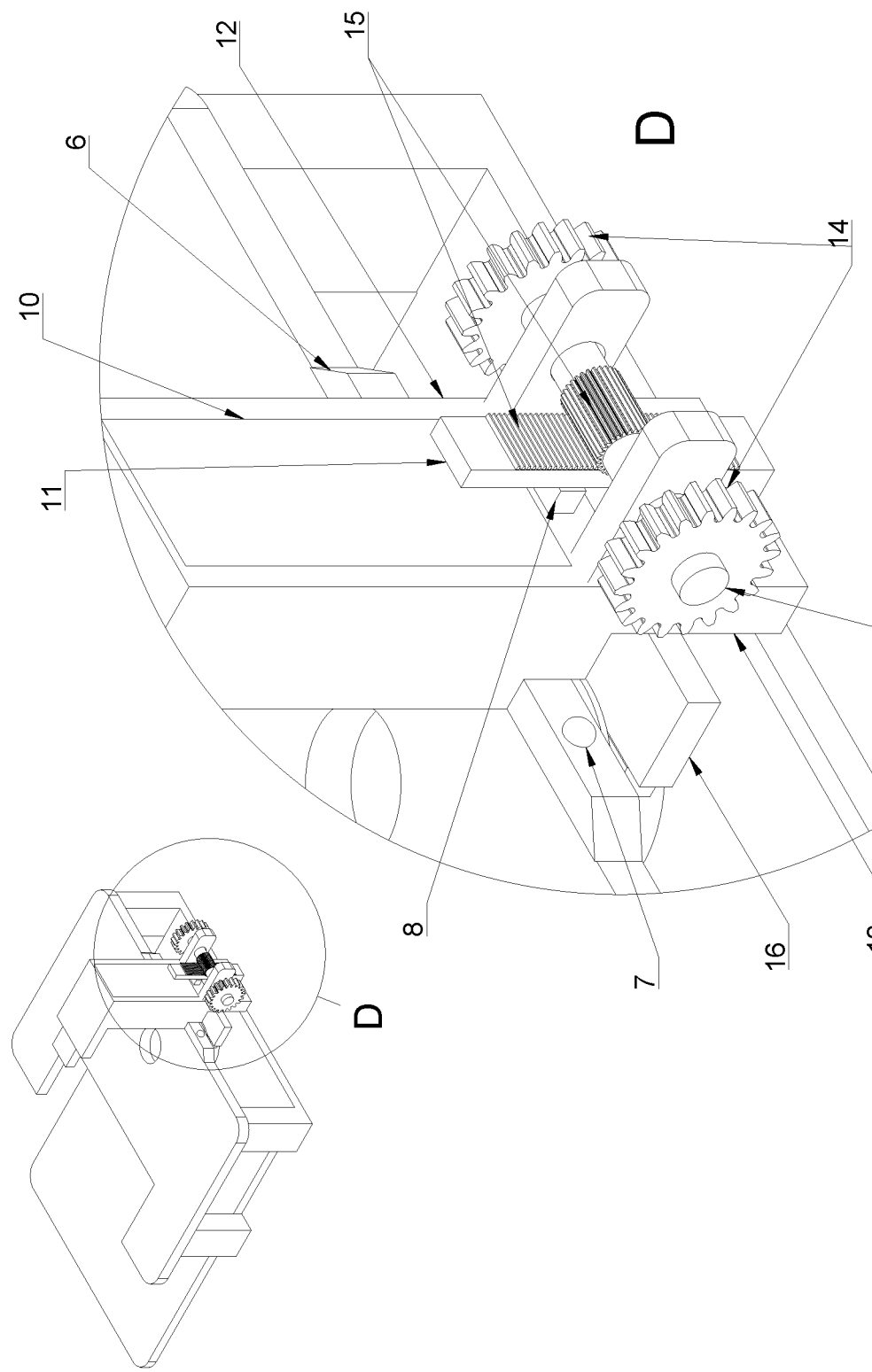
FIG. 2: Illustrates an embodiment of an adjustable magnifying loop's rack and pinion.
Figure 7:
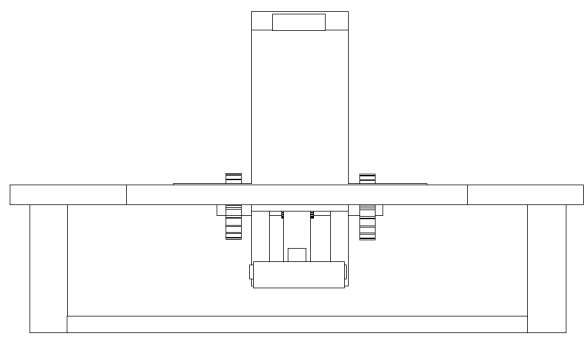
FIG. 7: Illustrates a front view of an embodiment of a smart media device platform.
Figure 8:
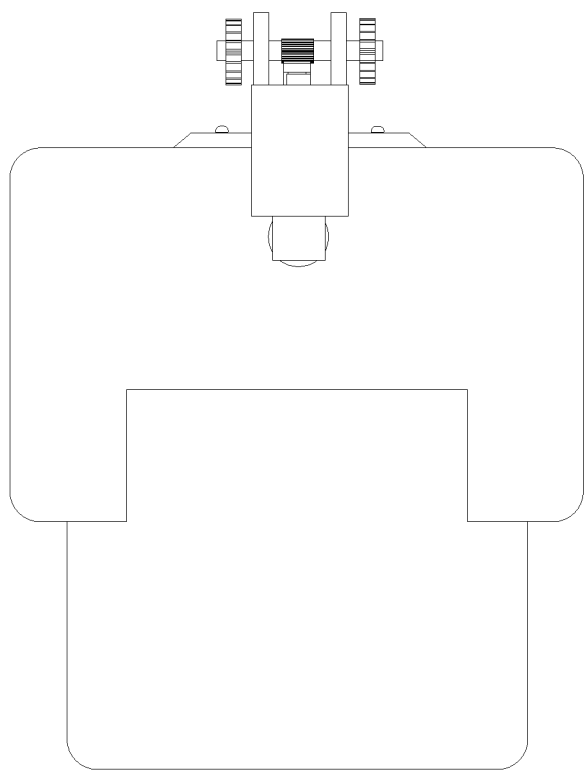
FIG. 8: Illustrates a top view of an embodiment of a smart media device platform.
Figure 9:
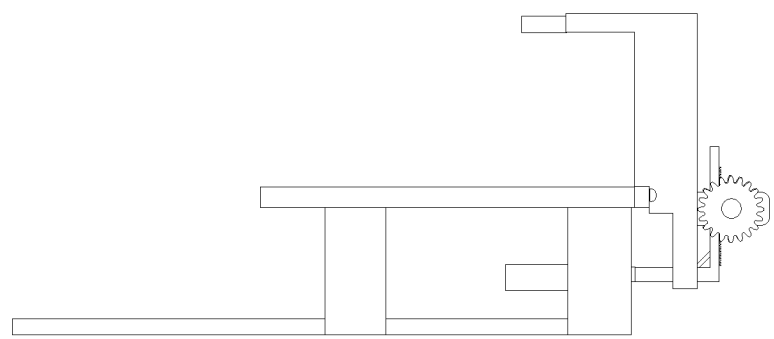
FIG. 9: Illustrates a side view of an embodiment of a smart media device platform.
Figure 10:
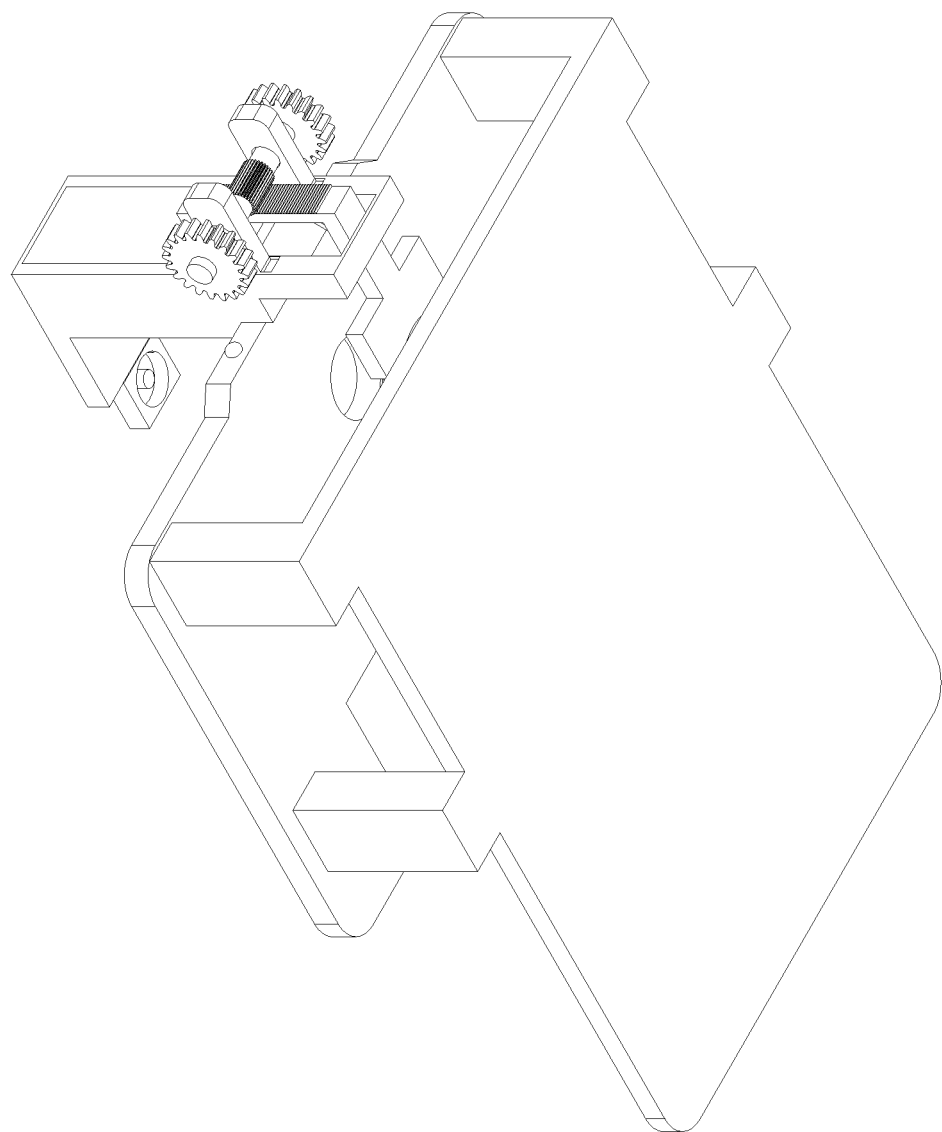
FIG. 10: Illustrates a bottom right back view of an embodiment of a smart media device platform.
Figure 11:
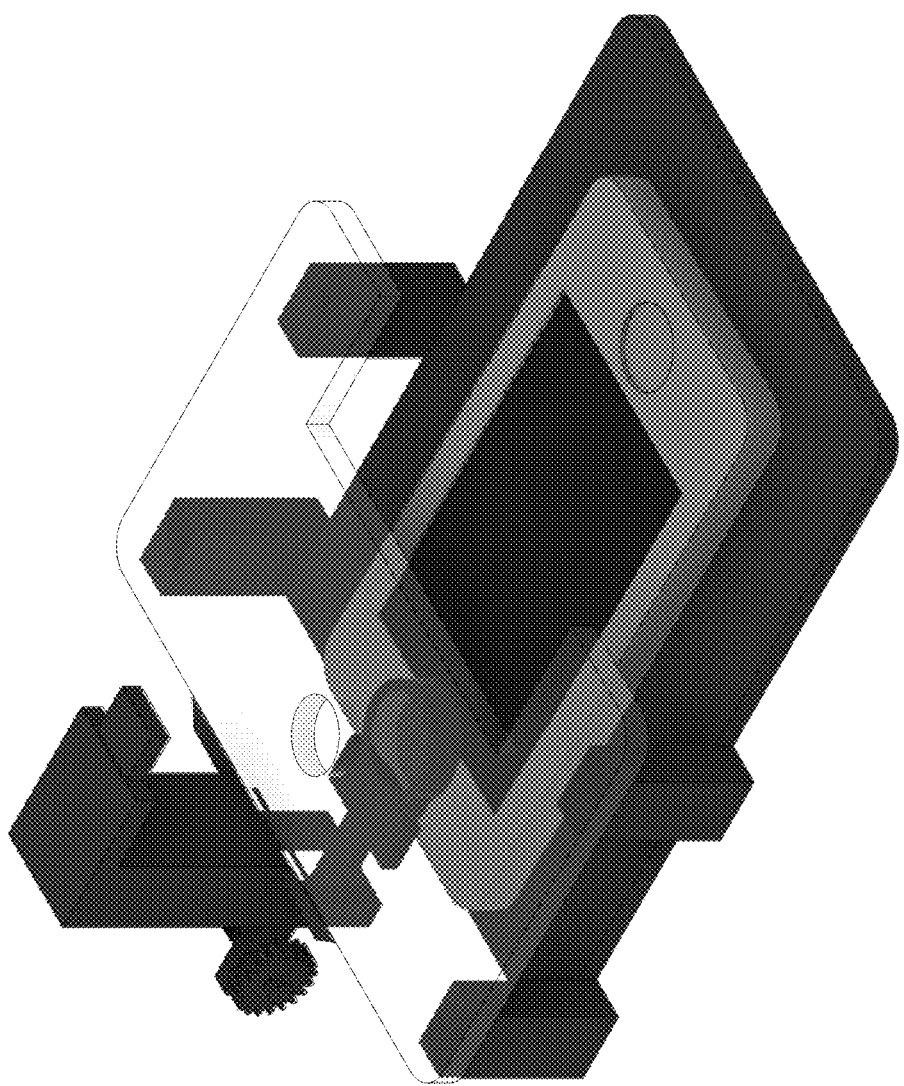
FIG. 11: Illustrates a top left front view of an embodiment of a smart media device platform, including the smart media device.

FIG. 2: The zoomed in section D is the rack and pinion adjustable scroll and its surrounding components. The support bracket 6 on said stage 1 is for weight distribution and leverage from the tower 12. Pin 7 is used to secure said bracket 6 to said sample stage 1. The cover 10 is to protect the battery pack within said tower 12. The rack and pinion bracket 13 is for securing the rack 11 and pinion 14 for the adjustable magnifying loop 18. The pinion 14 is secured to said bracket 13 with a peg 9. Said rack 11 incorporates fine grooves for an interlocking with grooves on pinion 14. Rack and pinion threading that interconnects 15. Plastic protrusion 8 is for counter balancing the weight from said magnifying loop 18, loop interchange interface 16, magnifying loop support arm 19 and loop encasing 17.

FIG. 3: The stage 1 is normal to a light source mount and to the smart media device platform base 5. A light source mount 20 is positioned over the hole for sample illumination.

FIG. 4: The section A illustrates said arm 19 of the adjustable magnifying loop 18 and pinion thread 15. Said arm 19 attaches to the interchangeable piece 16 that holds the said loop 18 and said casing 17.

FIG. 5: The section C illustrates a cross section view under said light source 20 and said housing 3. The tower 4 incorporates the wiring of said light source 20. Said cover 10 is attached to said tower 12.

FIG. 6: The section B illustrates a side view of the arm 4, cover 10, and a light source 20.

INDUSTRIAL APPLICABILITY

The industrial applicability of this apparatus is for use in a laboratory setting. The laboratory setting can be at a university, where students in a lab can analyze samples and receive images for presentations or further investigation. The laboratory setting of an industrial plant, where unknown contaminants or byproducts can be analyzed on the platform. The laboratory setting of a person's home, to learn microscopy through an online course. The laboratory setting of a production facility, where microstructures can be verified for quality control of the produced samples. The laboratory setting of verifying security features of a document, such as a monetary note or passport. The laboratory setting for biological applications, where cell cultures can be analyzed and photographed.

The invention claimed is:

1. A device comprising:
   a camera-enabled smart media device platform as a support surface for a camera-enabled smart media device;
   a fixed sample stage that positions a sample in place above the camera-enabled smart media device platform for imaging by the camera-enabled smart media device;
   a tower disposed on a side of the sample stage;
   a light housing disposed at a top of the tower for illuminating the sample to be imaged with a light source from above; and
   a vertically adjustable magnifying loupe disposed on the tower between the camera-enabled smart media device platform and the sample stage through which the camera-enabled smart media device images the sample.

2. The device of claim 1, wherein a viewport of the sample stage is aligned with the magnifying loupe.

3. The device of claim 1, wherein the magnifying loupe is detachable.

4. The device of claim 1, wherein the magnifying loupe is adjustable using a rack and pinion mechanism.

5. The device of claim 4, wherein the rack and pinion mechanism is held by a pin, rod, or clamp.

6. The device of claim 1, wherein the sample stage is attached to the tower using screws or pins.

7. The device of claim 1, wherein the camera-enabled smart media device platform can accommodate an object of at least 7 mm in height.

8. The device of claim 1, wherein multiple pillars connect the camera-enabled smart media device platform to the sample stage.

9. The device of claim 1, wherein the light source in the light housing is positioned above a viewport in the sample stage and aligned with the viewing port and magnifying loupe.

10. The device of claim 1, wherein an adjustment wheel is used to operate the rack and pinion.

* * * * *